United States Patent [19]

Morishita et al.

[11] Patent Number: 4,574,275
[45] Date of Patent: Mar. 4, 1986

[54] BATTERY CHARGE INDICATING CIRCUIT

[75] Inventors: Mitsuharu Morishita; Shinichi Kouge, both of Himeji, Japan

[73] Assignee: Mitsubishi Denki Kabushiki Kaisha, Tokyo, Japan

[21] Appl. No.: 477,541

[22] Filed: Mar. 21, 1983

[30] Foreign Application Priority Data

Mar. 23, 1982 [JP] Japan ................................. 57-47925

[51] Int. Cl.⁴ ............................................ G08B 21/00
[52] U.S. Cl. ...................................... 340/636; 320/48
[58] Field of Search ...................... 340/636, 635, 653; 320/40, 64, 48, 35; 322/28, 99

[56] References Cited

U.S. PATENT DOCUMENTS

| | | | |
|---|---|---|---|
| 4,254,396 | 3/1981 | Saudax | 340/635 X |
| 4,295,087 | 10/1981 | Morishita et al. | 322/99 |
| 4,365,241 | 12/1982 | Morishita | 340/636 |
| 4,399,429 | 8/1983 | LaPorte | 340/653 X |
| 4,471,287 | 9/1984 | Morishita et al. | 322/99 |
| 4,471,288 | 9/1984 | Morishita et al. | 322/99 |

Primary Examiner—James L. Rowland
Assistant Examiner—Chi K. Lau
Attorney, Agent, or Firm—Sughrue, Mion, Zinn, Macpeak and Seas

[57] ABSTRACT

A battery charge indicator circuit includes a voltage regulator 3 which maintains the voltage at a supply terminal 202 of an alternator rectifier 2 at a first predetermined value. A diode 404 and an indicating lamp 7 are connected in series between the alternator and a battery 5, and a switching circuit 406, 407 is connected between ground and the junction of the diode and indicating lamp. A capacitor 408 is connected in parallel to the switching circuit, and a Zener diode 403 causes the switching circuit to conduct when the supply terminal voltage reaches a second predetermined value higher than the first predetermined value. The charge on the capacitor causes the indicating lamp to remain illuminated to warn the driver that the battery is not being charged, in spite of the Zener diode being cyclicly rendered conductive and non-conductive.

1 Claim, 2 Drawing Figures

BATTERY CHARGE INDICATING CIRCUIT

BACKGROUND OF THE INVENTION

This invention relates to a battery charge indicating circuit, such as that used in a motor vehicle, and more particularly to a circuit for indicating the overcharging of a battery.

In a conventional circuit of this type when the ignition system of a vehicle is turned on, but the engine is not running, an indicating lamp is illuminated to indicate the non-charging of the battery. Upon starting the engine the indicating lamp is turned off as the output voltage of the alternator rises.

If the output voltage of the alternator drops to zero for some reason during the operation of the engine, the indicating lamp is illuminated to warn the driver of the battery discharge. However, if the output voltage of the alternator becomes extremely high due to faults, for example, in the voltage regulator while the engine is running normally, the indicating lamp remains off. Also, if the connection between the alternator output rectifier and the battery is broken while the voltage regulator is operating normally, the indicating lamp is only dimly illuminated or flickered, and does not provide an adequate warning to the driver of the battery discharge.

SUMMARY OF THE INVENTION

It is an object of this invention to provide a new and improved battery charge indicating circuit which is responsive not only to non-charging and overcharging states, but also to a disconnection in the circuit between the rectifier and the battery during normal operation of the voltage regulator.

This and other objectives are accomplished by providing a battery charge indicating circuit which comprises a voltage regulator for maintaining the voltage at a supply terminal of the rectifying means at a first predetermined value. A switching device is connected between ground and a junction of a diode and the indicating lamp, which are connected in series between the supply terminal and the battery. A charging capacitor is connected as an override element in parallel with the switching device, and serves to hold the switching device conductive in spite of cyclical potential variations at its control terminal to thereby maintain the indicating lamp brightly illuminated when the battery charging connection is broken.

DETAILED DESCRIPTION OF THE PREFERRED EMBODIMENT

Figure 1:
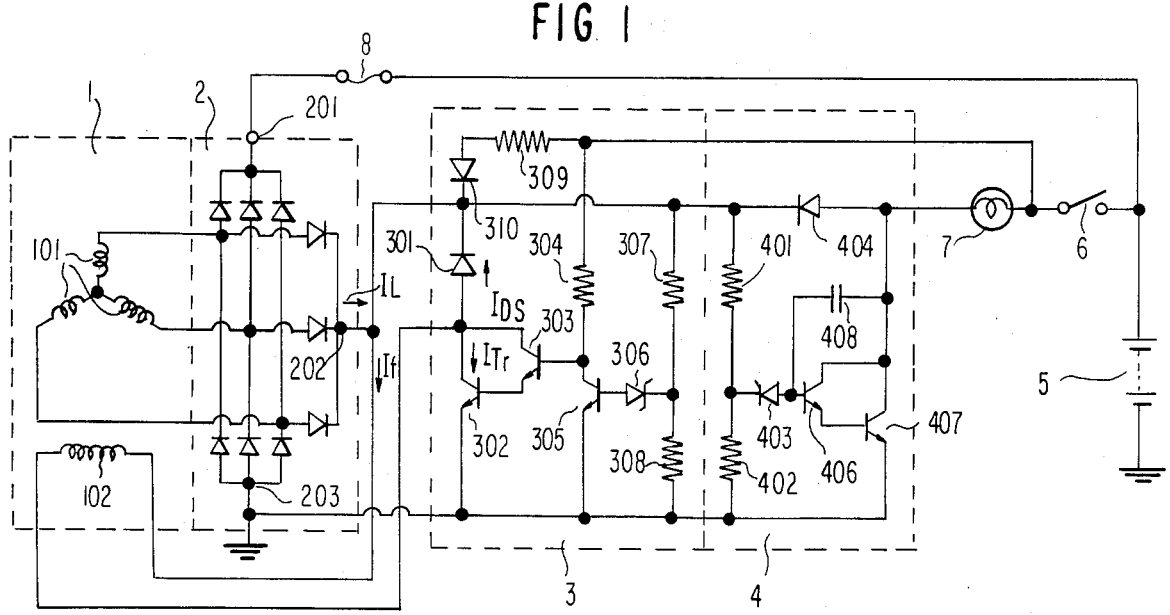
FIG. 1 is a schematic diagram of a circuit for indicating the charging state of a battery according to the present invention.

The embodiment of the invention shown in FIG. 1 includes a three-phase alternator 1 which is driven by an internal combustion engine, not shown, and which comprises Wye or star-connected armature windings 101 and a field winding 102. An associated full wave rectifier 2 rectifies the output voltage of the alternator and supplies rippled d.c. voltages at first, second and third supply terminals 201, 202 and 203. A battery 5, a key switch 6, an indicating lamp 7, and a diode 404 are connected in series with the field winding 102 to form a field current supply circuit.

A voltage regulator 3 is employed to maintain the output voltage of the alternator 1 at a first predetermined value in a manner to be described below. The voltage regulator comprises a diode 301 connected across the field winding 102 to absorb voltage surges generated thereby, with Darlington pair transistors 302 and 303 functioning as a switching means for interrupting the current flowing in the field winding. A resistor 304 and a transistor 305 form the base circuit for the transistors 302 and 303 to control their on-off states. A first Zener diode 306 is activated when the voltage at the second supply terminal 202 reaches the first predetermined value, and is connected between the junction of the series connected resistors 307, 308 and the base of the transistor 305. A series combination of a resistor 309 and a diode 310 is connected between the field winding 102 and the junction of the indicating lamp 7 and the key switch 6.

An overcharging detector 4 for detecting the voltage at the second supply terminal 202 comprises series-connected voltage dividing resistors 401 and 402 connected between the second supply terminal and ground. A second Zener diode 403 is activated when the voltage of the second supply terminal reaches a second predetermined value which is higher than the first predetermined value, and Darlington pair transistors 406 and 407 are connected between ground and the battery 5 through the key switch 6 and the indicating lamp 7. A capacitor 408 is connected between the collector of transistor 407 and the base of transistor 406. The Darlington pair transistors 302, 303 and 406, 407 may be replaced by appropriate individual transistors.

In operation, when the engine is started the key switch 6 is closed and current flows from the battery 5 through the key switch and resistor 304 to turn on the transistors 302 and 303. This enables field current flow from the battery 5 (rated at 12 V, for example) to the field winding 102 through a parallel combination of a series circuit comprising resistor 309 and diode 310, and a series circuit comprising indicating lamp 7 and diode 404, which produces a magnetomotive force in the field winding. At the same time, the indicating lamp 7 is illuminated to warn the driver of the battery discharge.

When the engine is started in this state, the driven alternator 1 generates alternating voltages in the armature windings 101 which produce rectified output voltages from the full-wave rectifier 2. If the output voltage at terminal 202 is lower than the first predetermined value, the potential level at the junction of the voltage dividing resistors 307 and 308 is low enough to maintain the Zener diode 306 in a non-conducting state. The field current thus continues to be supplied by the battery, causing the output of the alternator 1 to increase according to its speed of rotation.

Conversely, if the output voltage at terminal 202 exceeds the first predetermined value (for example 14 V), the potential level at the junction of resistors 307 and 308 is high enough to turn on the Zener diode 306. When this happens the base potential of transistor 305 is raised to turn it on, which switches off transistors 302 and 303 to interrupt the field winding current and reduce the output voltage of the alternator.

If the voltage at terminal 202 again drops below the first predetermined value, Zener diode 306 and transistor 305 return to their non-conductive state and transistors 302 and 303 turn on to resume field current supply and increase the alternator output. By repeating such on-off cycling at a frequency of 600 to 2000 Hz/sec, the output voltage at the first and second supply terminals 201 and 202 is maintained at the first predetermined value to charge the battery 5 to its rated value.

When the voltage at the second supply terminal 202 is almost equal to the battery voltage, the indicating lamp 7 is extinguished to indicate normal battery charging.

When the output at the second supply terminal 202 exceeds the first predetermined value, as might result from the failure of the voltage regulator 3, and reaches the second predetermined value (for example 16 volts which would overcharge the battery), the potential at the junction of resistors 401 and 402 becomes sufficiently high to activate the Zener diode 403 which turns on the transistors 406 and 407. Current then flows from the battery 5 to the indicating lamp 7 through the key switch 6 and transistors 406 and 407, which energizes the lamp to indicate that the battery is being overcharged and warn the driver of this dangerous or destructive condition with respect to the battery and other electrically connected parts. Since the output voltage at the second supply terminal 202 is blocked by the diode 404, no current from this terminal flows through the transistors 406 and 407.

Figure 2:
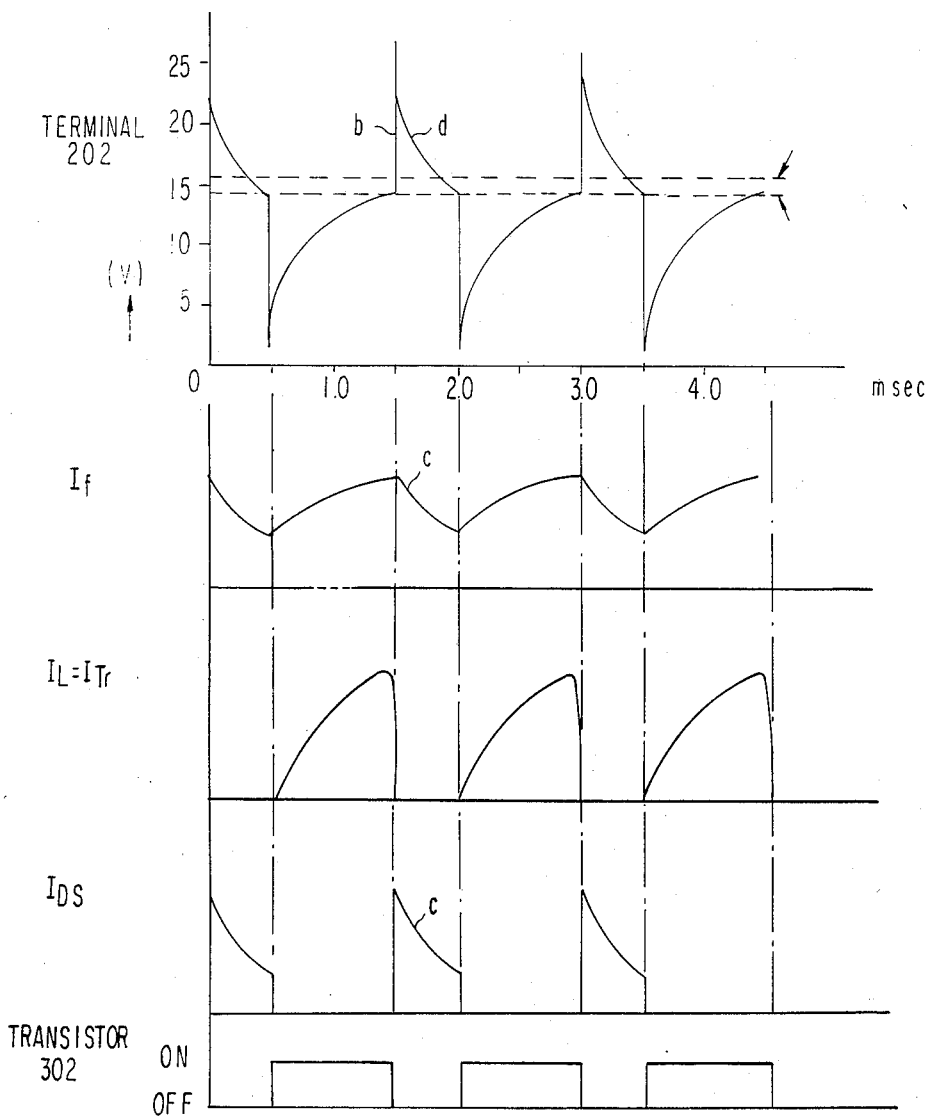
FIG. 2 is a waveform chart showing voltages and currents at several points in the circuit of FIG. 1.

When the circuit fuse 8 is blown and the battery is thus not being charged because the first supply terminal 201 is disconnected from the battery, and the voltage regulator 3 and the alternator 1 are operating normally, a waveform is produced at terminal 202 which periodically exceeds the second predetermined value, as shown in FIG. 2.

When the voltage at the second supply terminal 202 exceeds the first predetermined value, and the only load on the alternator is the self-excited field winding, transistors 302 and 303 are turned off. This causes the current $I_{Tr}$ of transistor 302 to be abruptly cut off, and the current for the field winding 102 is not provided as part of the current $I_L$ from the second supply terminal. However, the current $I_{DS}$, which results from the self-inductance of the field winding 102, flows through the diode 301 and the field winding causing the potential at the second supply terminal 202 to rise quickly (b, in FIG. 2). After reaching the peak level (for example, 25 V), the potential at the second supply terminal decreases proportionally (shown by d) as the current $I_{DS}=I_F$ decreases exponentially (shown by c) according to a time constant (L/R) determined by the self-inductance L and resistance R of the field winding.

When the voltage at terminal 202 exceeds the second predetermined value in each of the intervals shown in FIG. 2, the potential at the junction of resistors 401 and 402 increases to render Zener diode 403 and transistors 406 and 407 conductive, which charges the capacitor 408 so that its base side is positive and its collector side is negative.

When the voltage at terminal 202 drops below the second predetermined value, Zener diode 403 becomes non-conductive.

While the Zener diode 403 thus alternately becomes conductive and non-conductive, the transistors 406 and 407 remain conductive while the voltage at the second terminal 202 exceeds the second predetermined value due to the energy stored in capacitor 408 flowing into the base of transistor 406. As the result, the indicating lamp 7 remains brightly illuminated and warns the driver of the failure in the battery charging circuit.

What is claimed is:

1. A circuit for indicating the state of a battery (5) charged by an alternator (1) having a field winding (102) and at least one armature winding (101), comprising:
    (a) a full wave rectifier (2) for rectifying the output voltage of an alternator, including a first supply terminal (201) connected with a battery for charging the battery, and a second supply terminal (202) connected with a field winding for exciting the field winding;
    (b) a series combination of a diode (404) for preventing reverse charging current and an indicating lamp (7) for showing the charging state of said battery connected between said second supply terminal and said battery;
    (c) a voltage regulator (3) for maintaining the output voltage at said first and second supply terminals at a first predetermined value most suitable for charging said battery by controlling the current of said field winding;
    (d) switching means including first and second transistors forming a Darlington circuit in which a collector-emitter path of said first transistor (407) is connected between the junction of said diode and said indicating lamp and ground, and a collector-emitter path of said second transistor (406) is connected between a collector and a base of said first transistor;
    (e) a voltage divider including first and second resistors (401, 402) connected in series for dividing the output voltage at said second supply terminal of said full wave rectifier;
    (f) a Zener diode (403) connected between a junction of said voltage divider resistors and a base of said second transistor and conductive when said output voltage reaches a second predetermined voltage higher than said first predetermined voltage for activating said switching means to form a current path including said indicating lamp and said battery; and
    (g) means for maintaining the indicating lamp steadily and brightly illuminated upon an interruption of the charging connection between the first rectifier supply terminal and the battery rather than dimly flickering due to the cyclic conduction and non-conduction of the Zener diode, said maintaining means comprising a capacitor (408) connected between the collector and the base of said second transistor to be charged when said Zener diode conducts and discharged when said Zener diode ceases to conduct to thus maintain said switching means conductive for a predetermined period.

* * * * *